United States Patent [19]
Lenton

[11] Patent Number: 5,415,212
[45] Date of Patent: May 16, 1995

[54] MILLING CUTTER CHIP BREAKER

[75] Inventor: Frank Lenton, Syston, Great Britain

[73] Assignee: Wadkin plc, Leicester, United Kingdom

[21] Appl. No.: 133,077

[22] PCT Filed: Apr. 16, 1992

[86] PCT No.: PCT/GB92/00714
§ 371 Date: Mar. 9, 1994
§ 102(e) Date: Mar. 9, 1994

[87] PCT Pub. No.: WO92/18303
PCT Pub. Date: Oct. 29, 1992

[30] Foreign Application Priority Data
Apr. 17, 1991 [GB] United Kingdom ............... 9108253

[51] Int. Cl.⁶ ............... B27C 1/14; B27C 5/02
[52] U.S. Cl. ............... 144/243; 144/114 R; 144/117 R; 144/252 R
[58] Field of Search ............ 144/114 R, 117 R, 117 B, 144/116, 130, 243, 244, 252 R

[56] References Cited
U.S. PATENT DOCUMENTS

| | | | |
|---|---|---|---|
| 863,505 | 8/1907 | Budlong | 144/244 |
| 1,079,032 | 11/1913 | Solem | 144/117 R |
| 1,240,769 | 9/1917 | Osteman | 144/117 R |
| 1,619,008 | 3/1927 | Wilderson | 144/244 |
| 1,651,551 | 12/1927 | Roman | 144/244 |
| 1,796,186 | 3/1931 | Blood et al. | 144/244 |
| 2,577,975 | 12/1951 | Moore | 144/252 R |
| 2,788,035 | 4/1957 | Veersma | 144/243 |
| 5,007,469 | 4/1991 | Englert et al. | 144/252 R |

OTHER PUBLICATIONS
"Innovationen in der Holzverarbietung", Holz Als Roh-Und Werkstoff, vol. 48, No. 1 Jan. 1990.

*Primary Examiner*—W. Donald Bray
*Attorney, Agent, or Firm*—Oblon, Spivak, McClelland, Maier & Neustadt

[57] ABSTRACT

A chip breaker for a milling center having a bedplate and a rotary cutting tool includes a support and an operative chip breaker element adjustably mounted on the support, the chip breaker element being movable tangentially relative to the cutting tool and the support being adjustable perpendicularly relative to the bedplate.

11 Claims, 2 Drawing Sheets

MILLING CUTTER CHIP BREAKER

TECHNICAL FIELD

This invention relates to milling cutter chip breakers.

The chip breaker breaks up chips removed from the workpiece by the cutting tool and usually comprises a hood which prevents chips scattering and channels them to an extractor system. On one side of the cutting tool is the chip breaker shoe while on the other side is a workpiece pressure pad which holds the workpieces against the bedplate. It is desirable that these elements operate close to the cutting tool.

BACKGROUND ART

Because the milling cutter must use different cutting tools to cut different profiles on different workpieces, it is required to provide adjustment for the pressure pad and for the chip breaker shoe.

This is conventionally done by arranging the pad and shoe on brackets with provision for manual adjustment via guide slots and clamping screws both parallel to and perpendicularly to the bedplate. Adjustment is carried out by effecting each independent adjustment in turn and several times until the right combination of perpendicular and parallel movements is hit upon. The process is time consuming and only as accurate as the skill of the operator allows, and can lead to scrap components.

DISCLOSURE OF THE INVENTION

The present invention provides a milling cutter chip breaker without this disadvantage.

The invention comprises a milling cutter chip breaker comprising a support mounting an operative chip breaker element adjustably and with tangential movement relatively to a cutting tool.

Said element may be resiliently urged towards a workpiece.

Said element may comprise a chip breaker shoe, which may be pivotally mounted on the support—the pivot may be on the side of the cutter tool remote from the shoe.

The same element may, however, comprise a workpiece pressure pad on the rear side of the cutter tool remote from the chip breaker shoe. The pad may be mounted in a slide.

The support may be adjustable perpendicularly to the milling cutter bedplate.

The support may comprise two support members relatively adjustable lengthwise of the bedplate, one support member supporting the chip breaker shoe and the other support member supporting a workpiece pressure pad, whereby the shoe and the pad are relatively adjustable lengthwise of the bedplate.

The support adjustment may be effected automatically, for example by electric motor means under computer control. The arrangement may comprise a cutter tool measuring device inputting tool measurements to the computer which is programmed to determine chip breaker adjustments therefrom and to command the motor means to effect same.

BRIEF DESCRIPTION OF THE DRAWINGS

One embodiment of a milling cutter chip breaker according to the invention will now be described with reference to the accompanying drawings, in which.

BEST MODE FOR CARRYING OUT THE INVENTION

Figure 1:
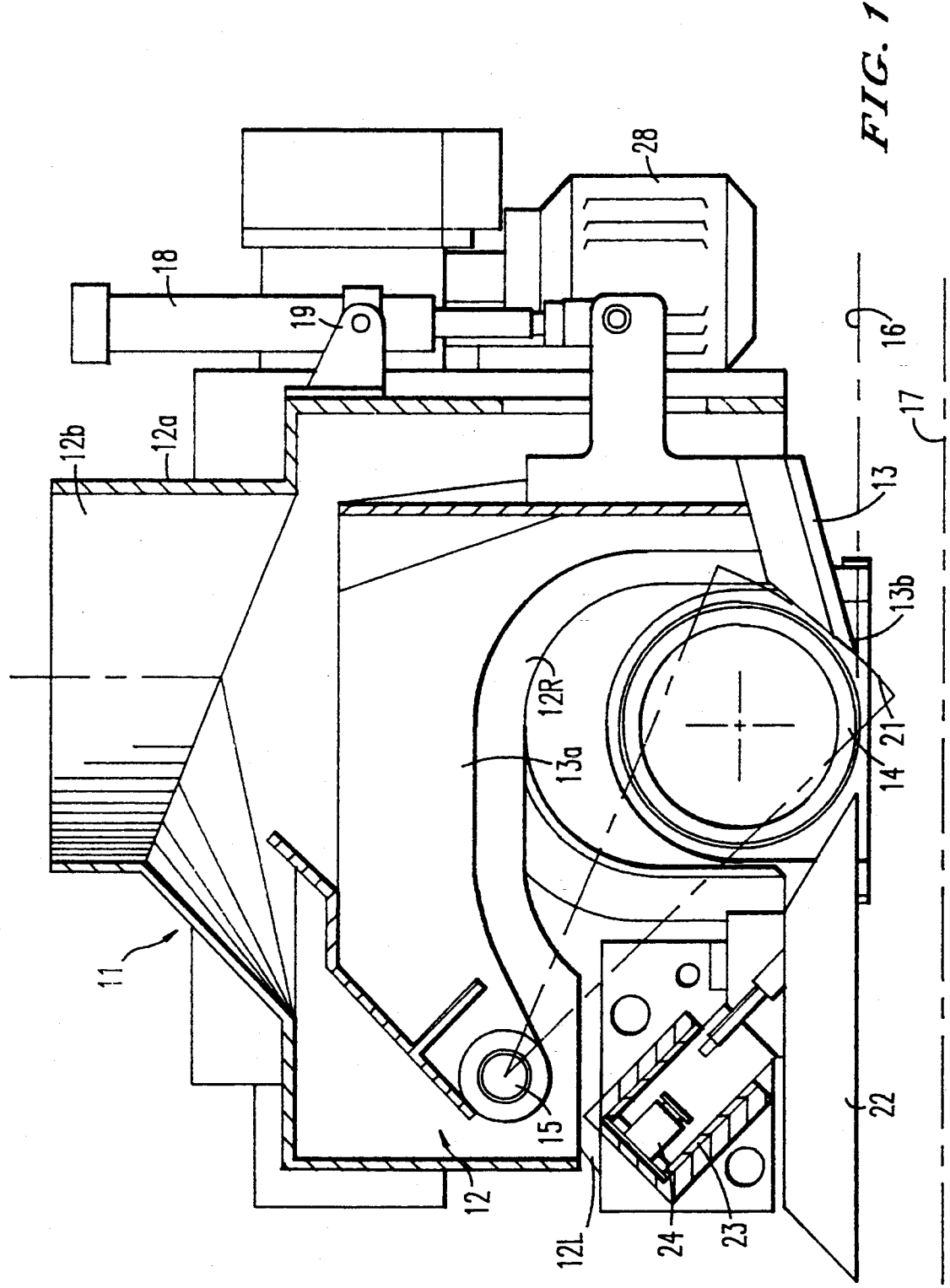
FIG. 1 is a sectional side elevation.
Figure 2:
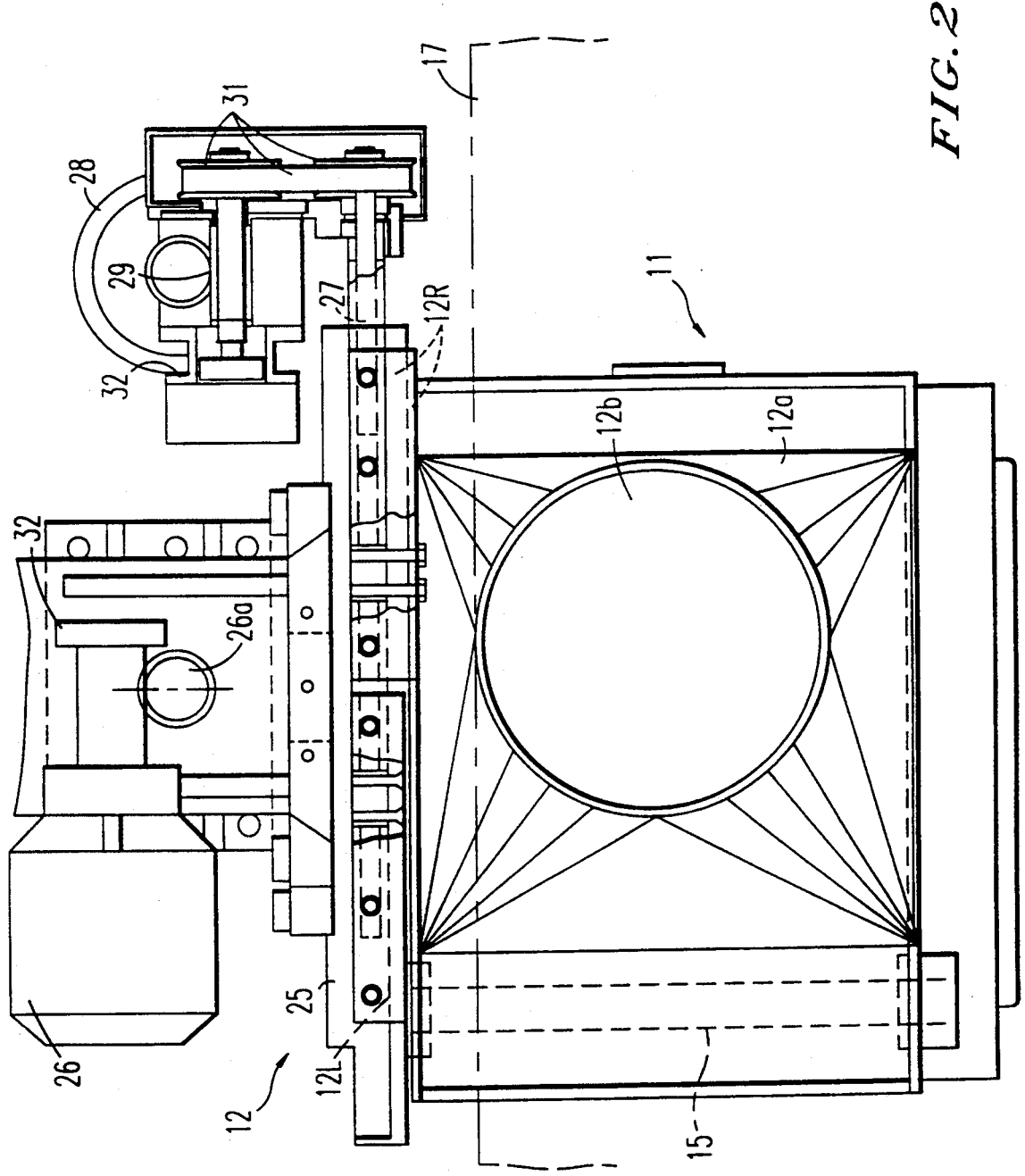
FIG. 2 is a plan view of the chip breaker of FIG. 1.

FIGS. 1 and 2 illustrate a milling cutter chip breaker 11 comprising a support 12 mounting an operative chip breaker element 13 adjustably and with tangential movement relatively to a cutter tool 14.

The element 13 comprises the chip breaker shoe. It is pivotally mounted on the support 12, the pivot 15 being on the side of the cutter tool 14 remote from the shoe 13, the shoe 13 being on a bracket 13a and being resiliently urged towards a workpiece 16 (indicated in broken line) on the bed plate 17 of the milling cutter by a cylinder 18 pivoted at pivot 19 on the support 12.

It will be seen that the edge 13b of the chip breaker shoe 13 has tangential movement relatively to the cutter tool 14 along the arc 21 centered on the pivot 15. It is not, of course, important that the movement be exactly tangential to the cutter tool, but that the edge 13b is always closely—but safely—spaced from the tool 14.

A workpiece pressure pad 22 is located on the rear side of the cutter tool 14 remote from the chip breaker shoe 13 and is also an operative chip breaker element mounted on the support 12 adjustably and with angular movement (45°) relatively to the cutter tool 14. The pad 22 is mounted on a slide 23 which is inclined at an angle of 45° to the bedplate 17 and which is resiliently held therein with a pneumatic pressure arrangement 24.

The support 12—which includes a hood 12a with an upper outlet 12b connectible to an extraction system—not shown—is adjustable perpendicularly to the bedplate 17 on a slide 25 by an electric motor 26 driving a lead screw 26a on which a nut runs attached to the support 12.

The support 12 comprises two support members 12L and 12R relatively adjustable lengthwise of the bedplate 17. Support member 12R supports the chip breaker shoe 13, by carrying the pivot 15 thereof. The other member 12L supports the pressure pad 22 by supporting the slide 23.

Each member 12R,12L has a nut engaging a lead screw 27 which has opposite hands of thread on the two parts that engage the nuts. The lead screw 27 is turned by an electric motor 28 working through a worm gear 29 and timing belt and pulley arrangement 31.

Shaft encoders 32 comprise an input to a computer not shown which operates the motors 26,28. The computer is supplied with information about the workpiece thickness and the tool dimensions—in either case by measuring devices not shown or via a keyboard input—to determine the adjustment of the support 12 perpendicular to the bedplate 17 and the relative adjustment of the support members 12L and 12R.

Thus a complex, time consuming and imprecise adjustment which can only be carried out manually by a skilled operative is reduced by the invention to a simple and straightforward adjustment which can be carried out manually or by manual data input or automatically under computer control.

In operation of the present invention, the hood 12a is pivotable about pivot 15. Chip breaker shoe 13 is attached to the hood 12a and movable therewith on the pivot 15 such that the motion of the edge 13b upon pivoting the hood about pivot 15 is substantially tangential to the cutter tool. Thus, quite a part from the facility to be lifted completely away for, perhaps, tool change purposes, the chip breaker edge 13b never fouls the cutter tool. The key feature is to put the pivot points sufficiently far away from the center of rotation of the tool so that the motion of the chip breaker edge is substantially tangential to the tool.

The pressure pad 22, despite being adjacent the pivot 15 is, by virtue of being mounted on the slide 23 and held thereon by resilient pressure pad arrangement 24, also able to be adjusted by tangential movement relative to the cutting tool. The adjustments are necessary upon tool change, when a tool having a different radius is substituted. It will be appreciated that this requires an adjustment of the pad 22 and the chip breaker 13. In prior art arrangements, each of these (where they were both present) was adjustable along cartesian coordinates parallel and orthogonal to the feed path of the work. It was problematical to make the adjustment because to independent adjustments had to made in a coordinated fashion for each component. With the present invention, however, only one adjustment is necessary per component.

We claim:

1. A chip breaker for a milling cutter having a bedplate and a rotary cutting tool, which comprises:
    a support; and
    an operative chip breaker element adjustably mounted on the support, the chip breaker element being movable tangentially relative to the cutting tool and the support being adjustable perpendicularly relative to the bedplate.

2. A chip breaker according to claim 1, said element being resiliently urged towards a workpiece.

3. A chip breaker according to claim 1 or claim 2, wherein said element comprises a chip breaker shoe.

4. A chip breaker according to claim 3, wherein the shoe is pivotally mounted on the support.

5. A chip breaker according to claim 4, wherein the pivot is located on a side of the cutting tool remote from the shoe.

6. A chip breaker according to claim 1 or claim 2, wherein said chip breaker element comprises a workpiece pressure pad located on a side of the cutting tool remote from the chip breaker element.

7. A chip breaker according to claim 6, wherein the pad is mounted in a slide.

8. A chip breaker according to claim 1, wherein the support comprises two support members relatively adjustable lengthwise of the milling cutter bedplate, one support member supporting the chip breaker element and the other support member supporting a workpiece pressure pad, whereby the shoe and pad are relatively adjustable lengthwise of the bedplate.

9. A chip breaker according to claim 1 or claim 8, which comprise a mechanism automatically effecting adjustment of the support.

10. A chip breaker according to claim 9, wherein the mechanism automatically effecting adjustment of the support comprises an electric motor which is computer controlled.

11. A chip breaker according to claim 10, which comprises a cutter tool measuring device inputting tool measurements to the computer which is programmed to determine chip breaker adjustments therefrom and to command the electric motor means to effect same.

* * * * *